US005493618A

United States Patent [19]

Stevens et al.

[11] Patent Number: 5,493,618

[45] Date of Patent: Feb. 20, 1996

[54] METHOD AND APPARATUS FOR ACTIVATING SWITCHES IN RESPONSE TO DIFFERENT ACOUSTIC SIGNALS

[75] Inventors: Carlile R. Stevens, Horseshoe Bay, Tex.; Dale E. Reamer, Lafayette, Calif.

[73] Assignee: Joseph Enterprises, San Francisco, Calif.

[21] Appl. No.: 58,727

[22] Filed: May 7, 1993

[51] Int. Cl.$^{6}$ .......... H04B 1/00

[52] U.S. Cl. .......... 381/110; 381/56

[58] Field of Search .......... 381/110, 56, 7; 367/197–199

[56] References Cited

U.S. PATENT DOCUMENTS

| | | | |
|---|---|---|---|
| D. 299,127 | 12/1988 | Boguss . | |
| 4,207,959 | 6/1980 | Youdin et al. | 381/110 |
| 4,513,189 | 4/1985 | Ueda et al. | 381/110 |
| 4,641,292 | 2/1987 | Tunnell et al. | 367/198 |
| 4,856,072 | 8/1989 | Schneider et al. | 381/110 |
| 5,199,080 | 3/1993 | Kimura et al. | 381/110 |

FOREIGN PATENT DOCUMENTS

| | | | |
|---|---|---|---|
| 1250654 | 2/1989 | Canada . | |
| 3608497 | 9/1987 | Germany | 381/110 |

OTHER PUBLICATIONS

Product Advertisement for The Clapper™, Joseph Enterprises, Inc.

Videotape of thirty (30) second and sixty (60) second television commercials for The Clapper™, Joseph Enterprises, Inc.

*Primary Examiner*—Stephen Brinich

*Attorney, Agent, or Firm*—Townsend and Townsend and Crew

[57] ABSTRACT

An acoustic switch device that independently operates two or more electrical appliances. The acoustic switch operates a first electrical appliance upon receipt of a first series of acoustic signals and operates a second electrical appliance upon receipt of a second series of acoustic signals that is different from the first series of acoustic signals.

9 Claims, 5 Drawing Sheets

METHOD AND APPARATUS FOR ACTIVATING SWITCHES IN RESPONSE TO DIFFERENT ACOUSTIC SIGNALS

NOTICE REGARDING COPYRIGHTED MATERIAL

A portion of the disclosure of this patent document contains material which is subject to copyright protection. The copyright owner has no objection to the facsimile reproduction by anyone of the patent document or the patent disclosure as it appears in the Patent and Trademark Office file or records, but otherwise reserves all copyright rights whatsoever.

FIELD OF THE INVENTION

The present invention relates generally to a sound activated switch. More specifically, the present invention relates to a sound activated switch that independently operates two or more electrical appliances by activating power switches after detecting different series of audio signals.

BACKGROUND OF THE INVENTION

In today's society convenience is almost a necessity. Manufacturers gear entire product lines to satisfy society's need for convenience. One common market that manufacturers have targeted with convenience in mind has been the market for electric and electronic appliances. Many people will elect not to use an electrical appliance such as a television or light, if they must walk across a room to turn the television or light ON. Thus, manufacturers have developed devices that remotely control and operate almost all electronic appliances.

Unfortunately, most remotely controlled appliances require a person to possess a remote control unit to operate the appliance. The requirement of possession in itself can be a major inconvenience. Often a person must walk across a room to retrieve the remote control unit, and frequently it may be misplaced, which, at best, requires extra time and effort to find.

To solve the problems associated with hand-held remote control units, some manufacturers have developed sound activated switches. There are a number of sound activated switches available for sale. Typically these devices turn electrical appliances ON and OFF in response to a specific sound. Some sound activated switches operate from hand-held sound generators. These devices, however, suffer from the same problem as other remote control units—possession of the controller is required before it can be used. Other sound activated devices operate in response to sounds physically produced by a person such as two closely spaced claps. These devices are very useful in solving the problems associated with the previously described remote control units and are especially useful to handicapped persons who have difficulty moving around a room.

However, one disadvantage associated with some of the currently available devices that are activated by hand-clapping or similar sound signals is that only a single sound-activated switch can operate in any given room unless all the controlled electrical accessories in that room are to be turned ON at the same time. Even in this case, one sound-activated switch may be slightly more sensitive than another or the switches may be placed in such a position that a series of hand claps will operate only one of the switches in the room. Thus, if a person tries a second time to operate a sound activated switch that did not activate the first time, the first switch may switch an appliance back ON when the second switch switches an appliance OFF.

Additionally, some prior art devices require manual adjustment to the acoustics of a room to function properly. If an inexperienced operator does not make the adjustments properly, appliances could be turned ON and OFF by unintended control signals, which is both frustrating and annoying.

SUMMARY OF THE INVENTION

The present invention solves the problems associated with the prior art by providing an acoustic switch that is operable without requiring a sound generating unit and that is able to independently operate two or more electronic appliances. A preferred embodiment of the present invention is an acoustic switch that is able to control two electrical appliances by recognizing and distinguishing between different preprogrammed series of acoustic signals such as hand-clapping sounds. The acoustic switch can independently operate the two electrical appliances by operating one appliance on recognition of a first series of acoustic signals and the second appliance on recognition of a second series of acoustic signals.

Another advantage of the present invention is that it provides for the manual selection of operating modes. In addition to its normal operating mode, the acoustic switch is operable in an away/intruder mode and in a learn mode. In the away/intruder mode, the acoustic switch will switch appliances ON upon the detection of any noise, while the absence of noise for a specified period of time will cause the acoustic switch to switch the appliances OFF.

In learn mode, it is possible to teach the invention, through its microcontroller, to remember a specific sequence of claps to operate one or more appliances. The acoustic switch can be programmed to operate in response to many different clap sequences. For example, two to five claps, or two claps then a pause and a third clap, or any combination of claps and pauses, can activate an appliance. Once the acoustic switch has been programmed to the desired clap sequence and placed in its normal operating mode, it will activate only to the newly learned sequence. In one embodiment of the present invention, the acoustic switch produces an audible beep to alert the user that the switch has successfully learned a new clap sequence.

In one embodiment, the present invention is configured as a small plastic housing that plugs directly into a wall outlet. Additional outlets on the box permit the attachment of two appliances, such as lamps, televisions, or fans. In the simplest mode of operation, two claps will turn one appliance ON and OFF, while three claps will turn a second appliance ON and OFF without operating the first-appliance. In other embodiments, it is possible for the invention to be designed to independently operate more than two appliances with different clap sequences.

Additionally, the invention is supplied with neon lamps that indicate when an appliance that is turned ON is connected to the acoustic switch.

The features and advantages of an acoustic switch according to the present invention will be more clearly understood from the following description taken in conjunction with the accompanying drawings.

DETAILED DESCRIPTION OF THE INVENTION

Figure 1:
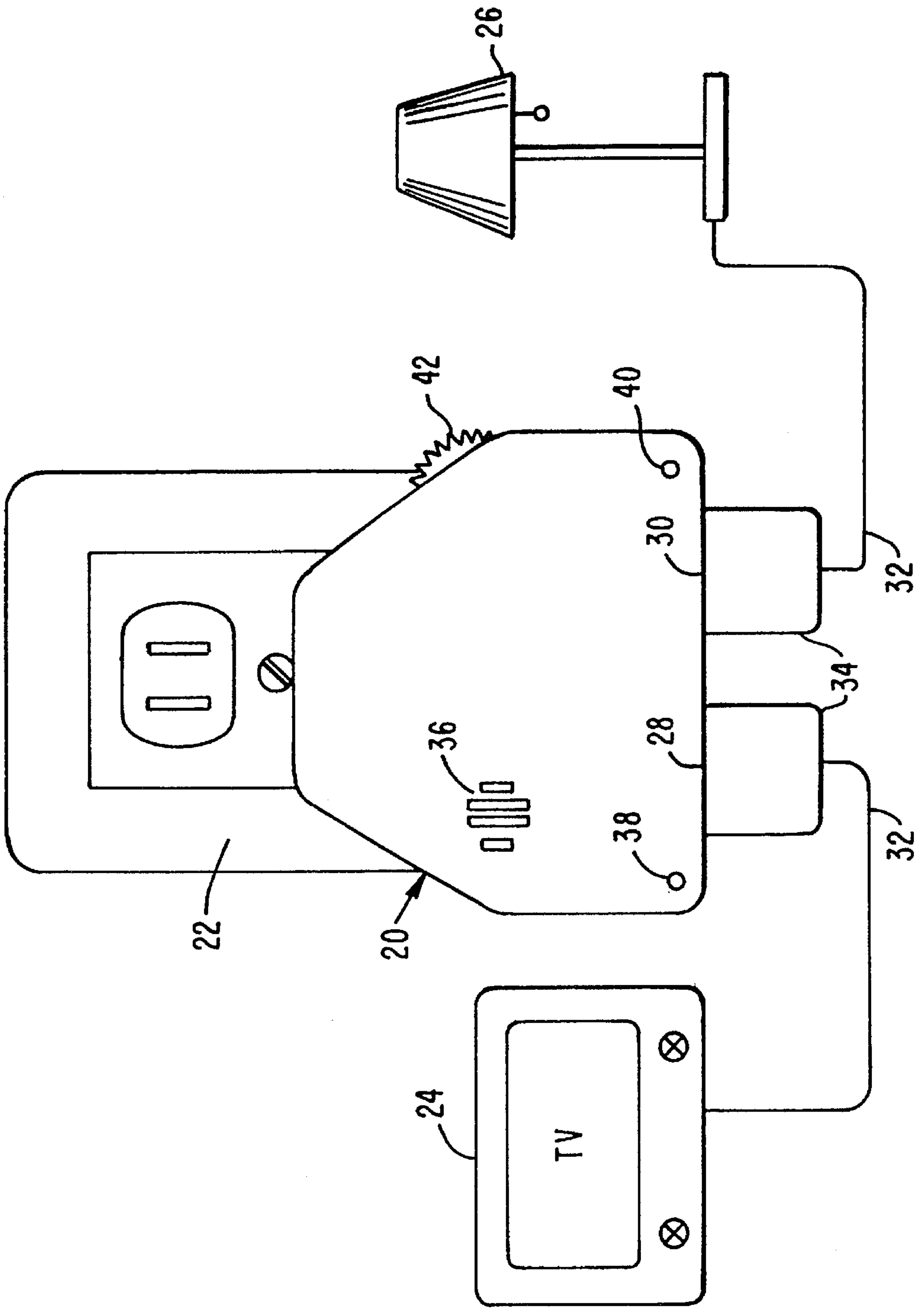
FIG. 1 is a perspective view of a preferred embodiment of the acoustic switch according to the present invention.

FIG. 1 is a perspective view of a preferred embodiment of an acoustic switch 20 according to the present invention. Acoustic switch 20 is used to independently operate two electrical appliances. As shown in FIG. 1, acoustic switch 20 plugs into a conventional electrical wall outlet 22. Electrical appliances 24 and 26 are then plugged into receptacles 28 and 30 using electric line cords 32 and plugs 34.

A microphone placed behind a microphone opening 36 receives acoustic signals from an area surrounding acoustic switch 20. Upon receipt of a specific first series of acoustic signals, acoustic switch 20 operates appliance 24 by supplying or depriving the appliance of electricity thus switching it ON or OFF. Upon receipt of a specific second series of acoustic signals, different from the first series, acoustic switch 20 operates appliance 26 by switching the appliance ON or OFF.

Indicators 38 and 40 indicate whether appliances 24 and 26 are plugged into receptacles 28 and 30, respectively. When appliances 24 and 26 are connected to receptacles 28 and 30, respectively, indicators 38 and 40, will be illuminated if the appliance is turned ON and acoustic switch 20 has switched it OFF.

Mode selector switch 42 allows a user to set the acoustic switch in one of two operating modes: normal operating mode or away/intruder mode. In a second embodiment of the present invention, mode selector 42 allows a user to set the acoustic switch in a learn mode in addition to the normal and away/intruder modes.

Figure 2:
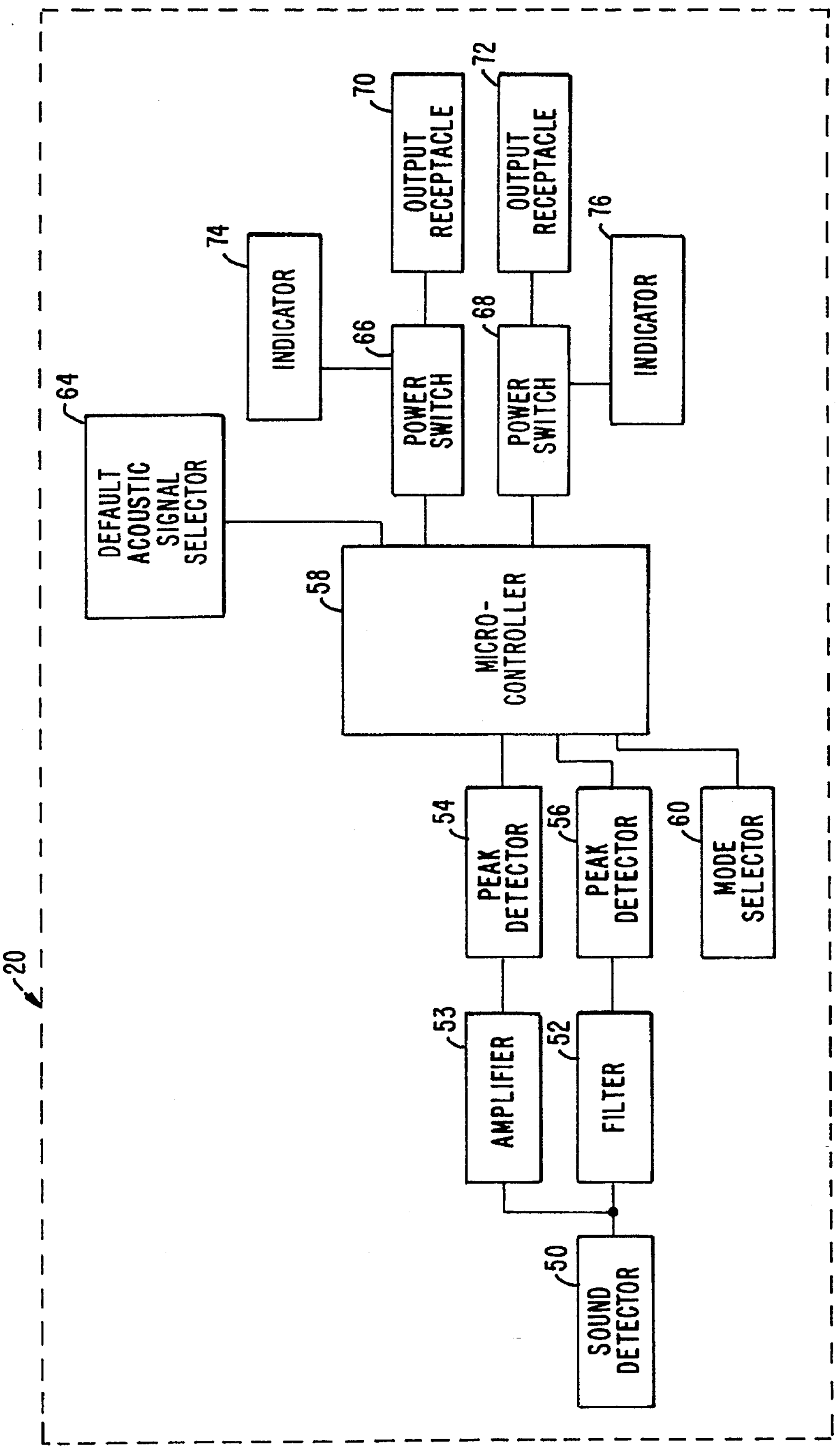
FIG. 2 is a block diagram of the electronic circuit of the embodiment of FIG. 1.

FIG. 2 is a block diagram of one embodiment of the electronic circuit for acoustic switch 20 depicted in FIG. 1. The electronic circuit for acoustic switch 20 comprises a sound detector 50, a filter 52, an amplifier 53, peak detectors 54 and 56, a microcontroller 58, a mode selector 60, a default acoustic signal selector 64, power switches 66 and 68, output receptacles 70 and 72, and indicator lamps 74 and 76.

Microcontroller 58 is a programmable microcontroller that comprises an analog-to-digital converter, a timer, a ROM memory, and a RAM memory.

Sound detector 50 has an output coupled to an input of filter 52 and an input of amplifier 53 which has an output coupled to an input of peak detector 54. An output of filter 52 is coupled to an input of peak detector 56. Peak detectors 54 and 56 both have outputs coupled to respective inputs of the analog-to-digital converter of microcontroller 58. Microcontroller 58 has an input coupled to mode selector 60 and an input coupled to an output of default acoustic signal selector 64. Microcontroller 58 also has outputs coupled to inputs of power switches 66 and 68. Power switches 66 and 68 have outputs coupled to output receptacles 70 and 72 and outputs coupled to indicators 74 and 76, respectively.

The operation of one embodiment of acoustic switch 20 is as follows. Acoustic signals are detected at sound detector 50, which converts the acoustic signals into electrical signals. The electrical signal output of sound detector 50 is simultaneously fed into filter 52 and amplifier 53.

Filter 52 is a bandpass filter that amplifies the output of sound detector 50 and filters electrical signals corresponding to sounds outside the frequency range of 2200 to 2800 hertz, which is the predominate frequency range of a typical hand clap. The output of filter 52 is fed into peak detector 56 which detects and holds the peak amplitudes of the signal output from filter 52. The analog output of peak detector 56 is then input to an analog input of microcontroller 58 where it is converted to a digital signal.

Amplifier 53 amplifies the unfiltered output of sound detector 50. Peak detector 54 detects and holds the peak amplitudes of the amplified, unfiltered signal output from sound detector 50, and the analog output of peak detector 56 is input to a second analog input of microcontroller 58 where it is converted to a digital signal. The output of peak detector 54 is used in detecting noise during the away/intruder mode, while the output of peak detector 56 is used to detect sounds associated with claps. In another embodiment, the two signals output from peak detectors 54 and 56 can be compared to allow microcontroller 58 to adjust its sensitivity to background noise.

Microcontroller 58 receives input signals from mode selector 60 and default acoustic signal selector 64. Mode selector 60 is a two position switch that allows a user to choose to operate acoustic switch 20 in one of two operating modes that include a normal operating mode and an away/intruder mode. In other embodiments mode selector 60 can be a potentiometer or similar device.

Default acoustic signal selector 64 is a jumper that can be positioned in two different positions. In the first position, default acoustic signal selector 64 causes acoustic switch 20 to operate power switch 66 on a two-clap sequence and power switch 68 on a three-clap sequence. In the second position, default acoustic signal selector 64 causes acoustic switch 20 to operate power switch 66 on a three-clap sequence and power switch 68 on a four-clap sequence. Another embodiments of the present invention does not include a default acoustic signal selector and thus does not allow a choice of which clap sequences operate appliances. While still other embodiments include default acoustic signal selectors that have three or more positions allowing a user to select from three or more different sets of claps sequences to operate appliances.

Microcontroller 58 controls the operation of power switches 66 and 68. Microcontroller 58 outputs signals that operate power switches 66 and 68 and enable the switches to operate electrical appliances plugged into output receptacles 70 and 72, respectively.

Indicator 74 is a neon lamp coupled across power switch 66 that lights up to indicate when an appliance connected at output receptacle 70 is turned ON but switched OFF by acoustic switch 20. Indicator 76 is a neon lamp coupled across power switch 68 that lights up to indicate when an appliance connected at output receptacle 72 is turned 0N but switched OFF by acoustic switch 20. Other embodiments of the present invention can use light emitting diodes or similar devices in place of the neon lamps.

Figure 3:
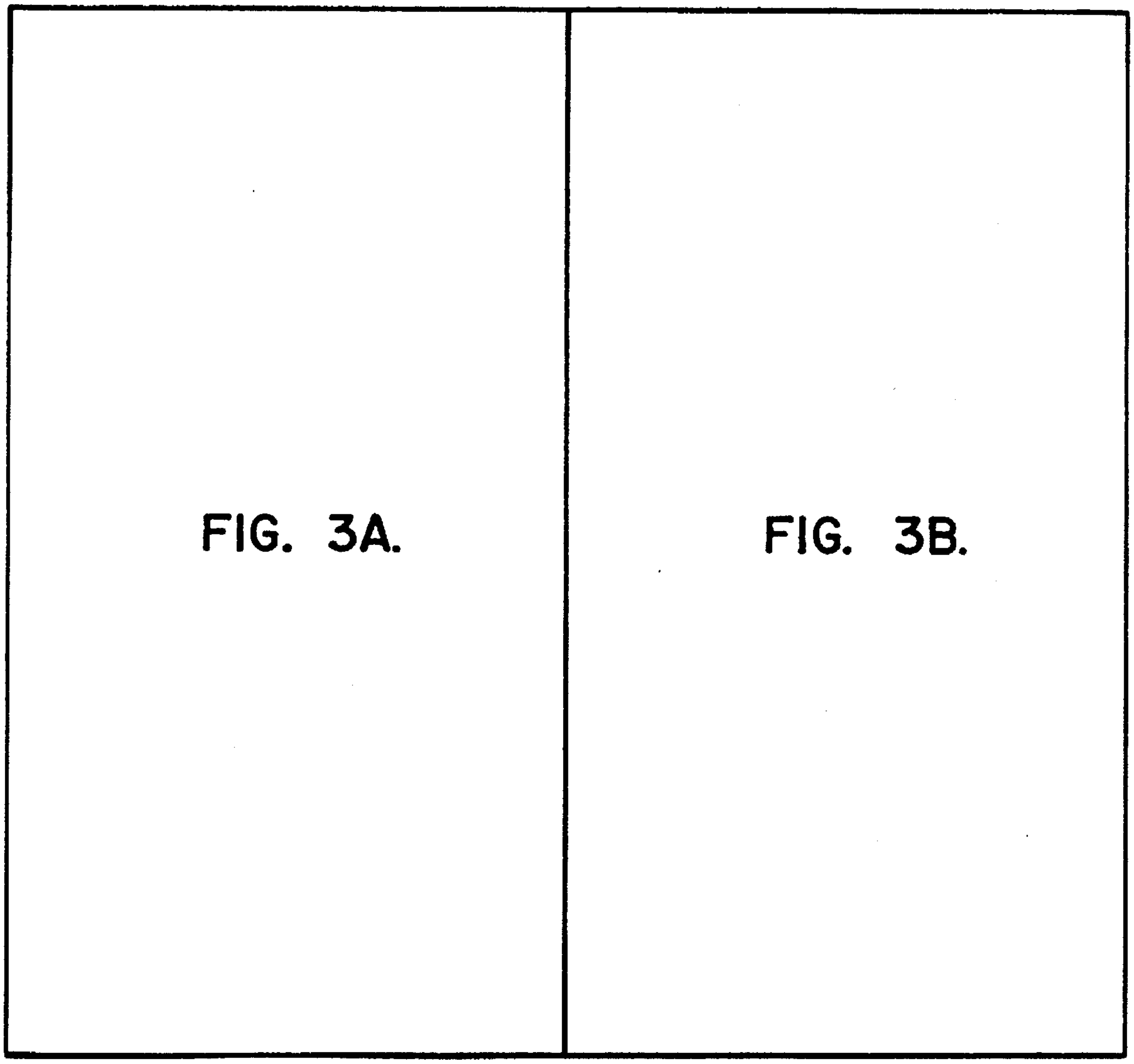
FIG. 3, 3A, and 3B are flowcharts of the functionality of the software program that controls one embodiment of the present invention.
Figure 3A:
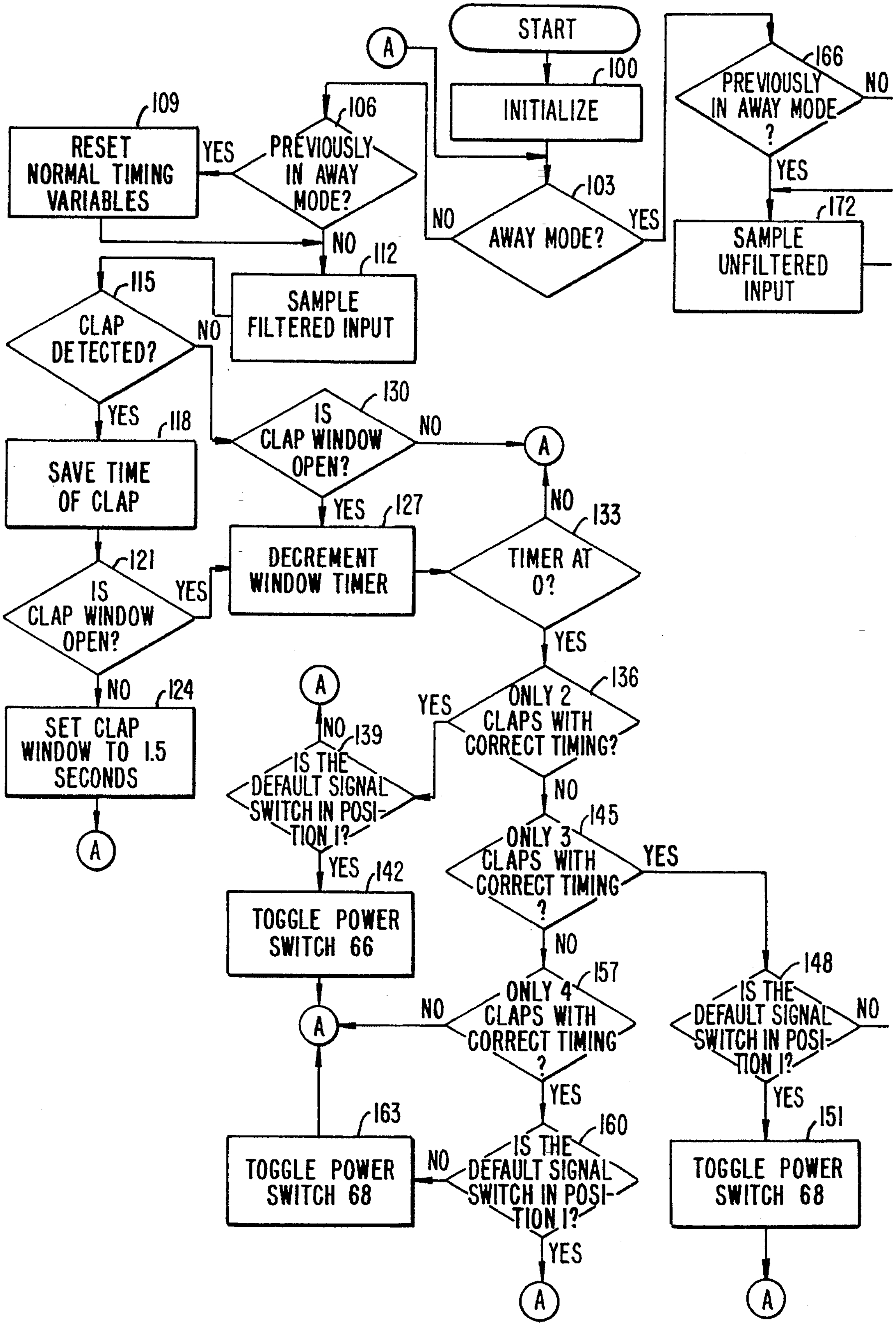
Figure 3B:
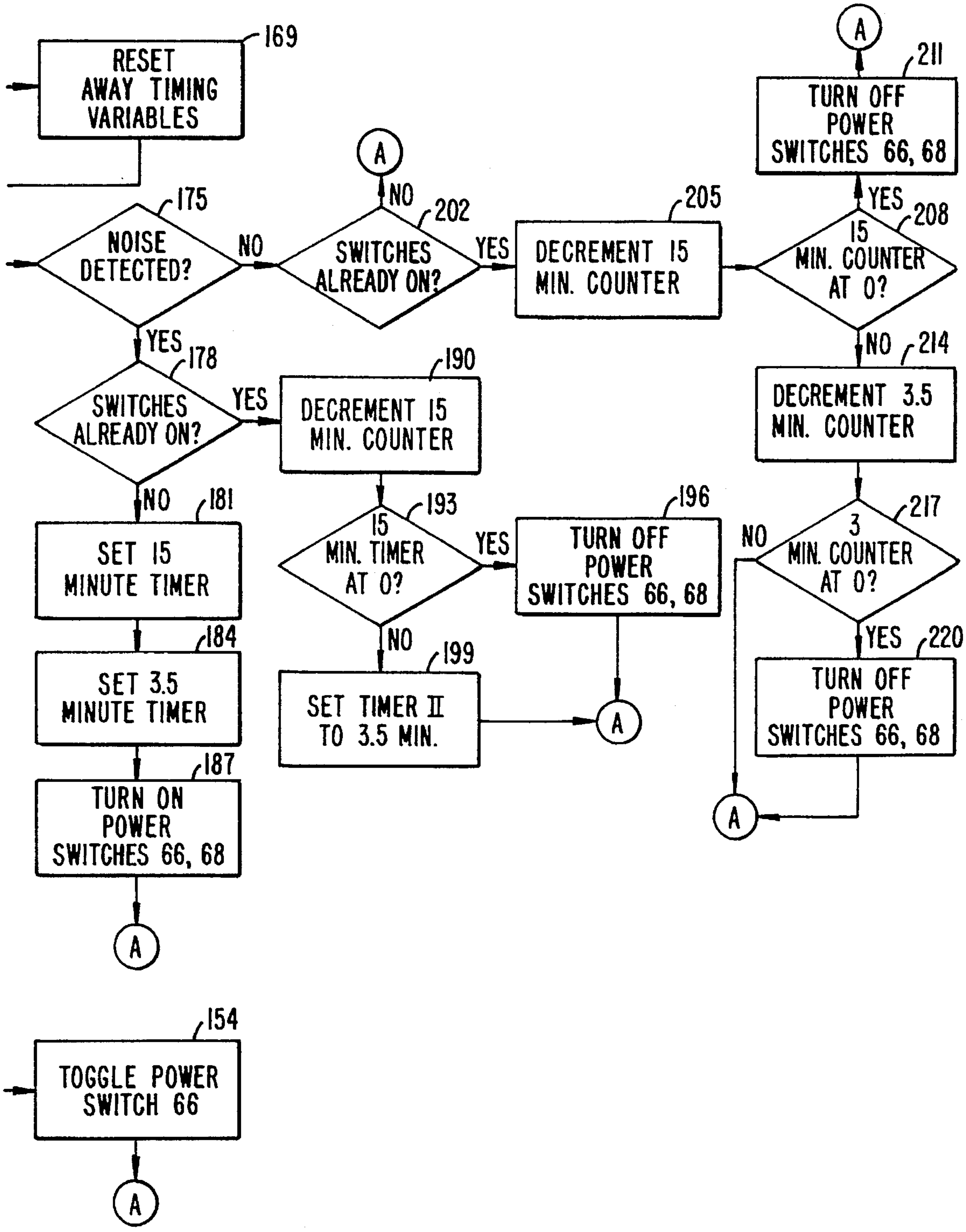

FIG. 3 is a flowchart of the functionality of the acoustic switch system according to one embodiment of the present invention. Upon startup, the system performs an initialization routine in block 100. The initialization routine includes the steps of setting up variables that are not time-dependent, determining if the AC lines being used by acoustic switch 20 are 50 or 60 Hertz, and setting up all time-dependent variables based on the line frequency. In block 103, the system determines if acoustic switch 20 is operating in away/intruder mode or normal mode by examining mode selector 60.

When acoustic switch 20 is operating in normal mode, a first series of claps will operate power switch 66 and a second series of claps, different than the first series, will operate power switch 68. When acoustic switch 20 is in away/intruder mode, any frequency sound of sufficient intensity will activate both power switches 66 and 68.

In normal mode, block 106 checks to see if acoustic switch 20 was operating in away/intruder mode last time the system checked the mode. This would be the case if mode selector 60 was just switched to normal mode. If acoustic switch 20 was previously operating in away/intruder mode, all timing variables used in normal mode are reset to default values by block 109. At block 112, the output of sound detector 50 after it passes through filter 52 and peak detector 56 is sampled.

In block 115, the signal from block 112 is analyzed to determine if a clap occurred. In determining if a clap occurred, the system looks at the first instant the sampled input rises above a minimum threshold clap level of 1.28 volts. This threshold level is exceeded when sound detector 50 produces an output voltage of 466 microvolts in response to the presence of a clap sound at the input of sound detector 50. If, after 200 milliseconds, the sampled input is above the threshold clap level two or more times before the next clap occurs, the first clap is rejected as noise. Otherwise, it is a valid clap.

If the processor detects that a clap sound has been detected in block 115, the time the clap occurred is saved in block 118. The system then checks to see if previous claps have been detected in block 121, which means that the clap window is already open. The clap window is a 1.5 second time interval that starts with the detection of a first clap. Acoustic switch 20 counts the number of claps that occur during the 1.5 second clap window when determining if an actionable clap sequence is detected. If this is the first clap, then the clap window timer is set to 1.5 seconds and other timing variables are set in block 124. If this is not the first clap, the clap window timer and other timing variables are decremented in block 127.

If no clap is detected in block 115, the system checks to see if the clap window timer is already on in block 130. If not, the system returns to block 103. Otherwise, the clap window timer and other timing variables are decremented in block 127. Block 133 checks whether the clap window timer has expired. If it has not, the system returns to block 103. If the clap window has expired, the system proceeds to determine if an actionable clap sequence was detected.

In block 136, the system checks to see if two and only two claps were recorded during the clap window, and if the claps were correctly spaced. Acoustic switch 20 counts the number of claps that occur during the clap window and calculates how far the claps are spaced apart. For the two-clap check to be affirmative, acoustic switch 20 must detect two and only two claps during the clap window and the two claps must be spaced 584±217 milliseconds apart.

If there were exactly two correctly timed claps, the system examines default acoustic signal selector 64 in block 139. If default acoustic signal selector is in position 1, power switch 66 is toggled in block 142. To toggle a power switch, the system checks whether it is already ON. If the power switch is ON, it is turned OFF; and if the power switch is OFF, it is turned ON. After power switch 66 is toggled, the system returns to block 103. If default acoustic signal selector 64 is not in position 1, it is in position 2. The clap sequence is then rejected as an invalid clap sequence, and the system loops back to block 103.

In block 145, the system checks to see if three appropriately timed claps were recorded during the clap window. The first step in determining if the three-clap check is affirmative, is to determine if exactly three claps were recorded during the clap window. If exactly three claps were not recorded, the three-clap check of block 145 fails. If three claps were recorded, the second step is to determine if the claps were correctly spaced. The system calculates the shortest time gap between any two of the claps and then uses that gap as a reference time, X. For the three-clap check to be affirmative, all three claps must be spaced X±217 milliseconds apart. If the three claps are not correctly timed, block 145 fails. If the timing of the three claps is correct, default acoustic signal selector 64 is examined in block 148. When default acoustic signal selector 64 is set to position 1, power switch 68 is toggled in block 151. Otherwise, default acoustic signal selector 64 is at position 2 and power switch 66 is toggled in block 154. After toggling either power switch 66 or power switch 68, the system loops back to block 103.

In block 157, the system checks to see if exactly four claps were recorded. The first step in determining if the four-clap check is affirmative, is to determine if exactly four claps were recorded during the clap window. If four claps were not recorded, the four-clap check of block 157 fails. If four claps were recorded, the second step is to determine if the claps were correctly spaced. The system calculates the shortest time gap between any two of the claps and then uses that gap as a reference time, X. For the four-clap check to be affirmative, all four claps must be spaced X±217 milliseconds apart. If the four claps are not correctly timed, block 157 fails. If the timing of the four claps is correct, default acoustic signal selector 64 is examined in block 160. When default acoustic signal selector 64 is set to position 1, the sound sequence is rejected and the system returns to block 103. Otherwise, default acoustic signal selector 64 is at position 2 and power switch 68 is toggled in block 163. Next, the system loops back to block 103.

If only one clap or more than four claps were recorded during the clap window, the clap sequence is rejected and the system returns to block 103.

When acoustic switch 20 is operating in the away/intruder mode, block 166 checks if mode selector switch 60 was just switched. If it was, block 169 resets all the timing variables used in the away/intruder mode, turns OFF power switches 66 and 68, and prevents a noise from activating the power switches for one full second. At block 172, the unfiltered output of sound detector 50 is sampled after it passes through peak detector 54.

Block 175 determines if acoustic switch 20 detects a noise of sufficient signal strength to activate power switches 66 and 68. In determining if an actionable noise is detected by acoustic switch 20, the system looks at the unfiltered sound input using two different envelopes: a long attack envelope and a short attack envelope. The short attack envelope responds to changes in noise level very rapidly, while the long attack envelope responds to noise level changes slowly. If a sound slowly increases in intensity over a long time period, the short and long attack envelopes will respond almost identically to the sound. Thus, the difference between the two envelopes will be negligible and the impulse will be essentially zero. However, if a sound occurs that has a sharp increase in intensity over a short period of time, the short attack envelope will quickly recognize the increased sound intensity while the long attack envelope will slowly respond to the changed intensity. Therefore, the difference between the two envelopes at a time $T_1$ after the initial sound is detected and at or near the sound's highest intensity level will be large resulting in a large impulse value. If the impulse value (the difference between the envelopes at a given time) is above a minimum threshold level of 400 millivolts, which occurs when sound detector 50 produces an output voltage of 400 microvolts in response to an external noise, an actionable noise is detected.

Block 178 then checks whether or not power switches 66 and 68 are already turned ON. When power switches 66 and 68 are not already ON, block 181 sets a first timer to fifteen minutes, block 184 sets a second timer to approximately three and a half minutes, and block 187 toggles power switches 66 and 68 to turn them ON. The first timer is used because acoustic switch 20 will turn power switches 66 and 68 OFF after fifteen minutes of the first noise being detected even if continuous noise is detected throughout the fifteen minute period. The second timer is used because acoustic switch 20 will turn power switches 66 and 68 OFF if after three and a half minutes from detecting a noise, no other noise is detected. After setting up the timers and switching power switches 66 and 68 ON, the system loops back to block 103.

When power switches 66 and 68 are already ON, block 190 decrements the fifteen minute timer. Block 193 then checks whether the 15 minute timer has timed out. If it has, block 196 toggles power switches 66 and 68 to turn them OFF and keeps them OFF for one full second. The system then loops back to block 103. If the fifteen minute timer has not expired, block 199 resets the three and a half minute timer, and the system returns to block 103.

If no noise or a noise of an insufficient level is detected at block 175, block 202 checks whether power switches 66 and 68 are already ON. If they are not ON, the system loops back to block 103. If power switches 66 and 68 are already ON, the fifteen minute timer is decremented by block 205. Block 208 examines whether the fifteen minute timer has expired. If it has, block 211 toggles power switches 66 and 68 to OFF and waits for one complete second before allowing any further noise to activate power switches 66 and 68. The system then returns to block 103.

If the fifteen minute timer has not expired in block 205, block 214 decrements the three and a half minute timer. Block 217 then checks whether the three and a half minute timer has expired. If the three and a half minute timer has expired, block 220 toggles power switches 66 and 68 to OFF, and the system returns to block 103. Otherwise, if the three and a half minute timer has not expired at block 217, the system simply loops back to block 103.

The present invention uses bilateral triode switches (triacs) for power switches 66 and 68. Thus, the system stored in microcontroller 58 pulses the gate of the triac to turn it ON. The triac must then be continuously pulsed every positive and negative line crossing for it to stay ON. To turn it OFF, the system simply stops pulsing the triac's gate. When turning one of the triacs ON or keeping it ON, the system pulses the triacs gate with a low signal for 4 microseconds then returns the gate to high. Because some applications contain large inductive loads and might be up to 90 degrees out of phase with the line voltage, the system continuously pulses the triac's gates every 250 microseconds for about 4.5. milliseconds after each voltage zero crossing. This ensures that all appliances are properly activated.

Additionally, a microphone is used for sound detector 50 and a three-stage bandpass filter is used for filter 52. Each stage of the three-stage filter has a gain of 14 at 2500 hertz. Thus, the overall gain of filter 52 is 2744 at 2500 hertz. The three-stage filter has an extremely sharp roll-off, however, so that at 2200 or 2800 hertz, the gain of each stage of the amplifier is 0.707 for an overall gain of 0.353. In this embodiment, amplifier 53 has a gain of approximately 1000.

Table 1 illustrates an outline in pseudo code of the main subroutines that make up one embodiment of the software system described in FIG. 3. The program of Table 1 is set up as a sequence of tasks that execute in a continuous loop. The subroutines are timed so that the filtered and unfiltered outputs of sound detector 50 are sampled approximately every millisecond. It also allows for the gates of triacs 66 and 68 to be pulsed every 250 microseconds when the triacs are conducting current.

Attached to the end of the application as Appendix A is a listing of the ROM source code for one embodiment of the program outlined in pseudo code in table 1. The source code is stored in the ROM of microcontroller 58, which is an 8-bit microcontroller chip by SGS Thompson, Model ST 6210. The source code is compiled by the ST6 Macro-assembler, version 3.01—August 1990.

TABLE 1

```
This program is set up so that a sequence of tasks is
executed in a continuous loop. The timing of the tasks is
such that both the filtered and unfiltered inputs to
microcontroller 58 are continuously sampled every
millisecond.
POWER UP
    Execute LINE Subroutine
MAIN LOOP
    Execute TOGGLE Subroutine
    Execute READ Subroutine
    Execute FSOUND Subroutine
    Execute TOGGLE Subroutine
    Execute READ Subroutine
    Execute ASOUND Subroutine
RETURN TO MAIN LOOP
LINE SUBROUTINE
    Measure time elapsed between zero crossings of line
        voltage for two seconds to determine if line is
        60 or 50 hertz.
    Load all registers related to line timing with
        appropriate values based on line frequency.
    RETURN
TOGGLE SUBROUTINE
    If the toggle counter is loaded and either triac flag
        is set, pulse appropriate triac gate signal low
        for 4 microseconds then return signal high.
    Decrement the toggle counter so that pulses extend to
        4.5 milliseconds beyond each line voltage zero
        crossing.
    RETURN
READ SUBROUTINE
    If positive line voltage half cycle
        Execute TOGGLE Subroutine
        Execute TIME Subroutine
        Execute TOGGLE Subroutine
    RETURN
    If negative line voltage half cycle
        Execute TOGGLE Subroutine
        Execute MODE Subroutine
        Execute COMPARE Subroutine
        Execute TOGGLE Subroutine
    RETURN
MODE SUBROUTINE
    Determines if Mode Selector 60 is set to
        away/intruder mode or normal mode.
    If normal mode, RETURN
    If away/intruder mode, look at the activate flag from
        the COMPARE subroutine to turn the triacs ON or
        keep the triacs ON -- when turning the triacs
        ON, set the 3.5-minute and 15-minute timers.
    If the triac flags are set and the activate flag was
```

TABLE 1-continued

```
        not set during the last 3.5-minutes, turn the
        triacs OFF.
    If the triac flags are set and the activate flag is
        set, reset the 3.5-minute timer.
    If the 15 minute timer expires, turn the triacs OFF
for 1 full second before allowing them to be
        reactivated.
    RETURN
FSOUND SUBROUTINE
    Reads voltage value from filtered peak detector
        output and compares to a threshold value.
    If voltage > threshold, starts timer for clap window
        or stores the time of occurrence from a previous
        clap if timer is already started.
    After a 200 msec period from detecting a "clap",
        compare sampled voltage to a calculated value (2
        volts below maximum amplitude).
        If more than 2 values > calculated value occur
            before the next clap, the "clap" is
            rejected as a clap and thought to be only
            noise.
    When the 1.2 second timer for the clap window
        expires, the total number of claps during the
        1.2 second period are counted.
        If 2 claps, separation time = 584 msecs.
        If 3 claps, separation time = the shortest time
            difference between any two of the three
            claps.
        If 4 claps, separation time = the shortest time
            difference between any two of the four
            claps.
        {CLAP calculations are continued in the second
        half the ASOUND subroutine}
    RETURN
TIME SUBROUTINE
    Decrements all timing registers.
    RETURN
ASOUND SUBROUTINE
    Reads voltage level from unfiltered peak detector
        output.
    Calculates short attack, short decay envelope.
    Calculates long attack, long decay envelope.
    Difference between the envelopes is the impulse which
        is used in the COMPARE subroutine.
    {CLAP calculations are then continued from FSOUND}
        If 2 claps separated by separation time ± 160
            msec and default signal selector indicates
            operate on 2 and 3 claps, invert the flag
            for triac 1.
        If 3 claps separated by separation time ± 160
            msec and default signal selector indicates
            operate on 2 and 3 claps, invert the flag
            triac 2; otherwise, invert the flag for
            triac 1.
        If 4 claps separated by SEPARATION TIME ± 160
            msec and default signal selector indicates
            operate on 3 and 4 claps, invert the flag
            for triac 2.
        Else, reject clap sequence.
    RETURN
COMPARE SUBROUTINE
    Looks at the value of the impulse variable from
        ASOUND and counts the number of occurrences of
        the impulse > a threshold value. If there are 4
        or more occurrences of impulse > the threshold,
        the activate flag is set to activate the triacs.
    RETURN
```

The program listed in table 1, comprises eight main subroutines: Line, Toggle, Read, Time, Compare, Mode, Fsound, and Asound. Upon start-up, the program executes the Line subroutine to determine if the AC line frequency is 50 or 60 hertz. After calculating the line frequency, the Line subroutine completes its execution by loading all the registers that hold variables relating to line timing with values based on the line frequency.

Next, the program enters a loop that continuously executes the following subroutines in the respective order: Toggle, Read, Fsound, Toggle, Read, and Asound. The timing of the program is such that the Toggle subroutine is executed approximately every 250 microseconds to ensure that triacs 66 and 68 continuously conduct current if appropriate.

The Toggle subroutine is run to turn triacs 66 and 68 ON and to ensure that they continue to operate until they are turned OFF. When a triac is turned ON, its flag is set in either the Asound or Fsound subroutines. The flag for the 0N triac stays set throughout the execution of the program until the triac is to be turned OFF, at which time the triac flag is reset. To turn a triac ON and to keep it ON, the Toggle subroutine continuously pulses the triac's gate low for 4 microseconds every 250 microseconds. The pulses start every time the sinusoidal AC voltage changes polarity, and they continue for a 4.5 millisecond period afterwards. As explained above, this procedure is necessary to ensure that the triacs stay ON when they are operating a large inductive load. The Toggle subroutine uses counters to keep track of all of the necessary time sequences.

After the Toggle subroutine has completed, the Read subroutine is executed. The Read subroutine reads and converts the voltage level from two resistors that are not shown but are coupled to an input of microcontroller 58. The value of the resistors is used to set the time of the time-out function in away/intruder mode. Presently the resistors are sized so that they provide a voltage drop at an input of microcontroller 58. The voltage drop is measured by microcontroller 58 and converted into digital data which sets one of the away/intruder mode timers to 3.5 minutes. By changing the value of the resistors, the value of the 3.5 minute timer can be changed.

The Read subroutine also checks whether the line voltage is a positive half cycle or a negative half cycle. When the line voltage is positive, the following subroutines are executed in order: Toggle, Time, and Toggle again. When the line voltage is negative, the Toggle subroutine is executed followed by Mode, Compare, and then Toggle again.

The Time subroutine is used to decrement all time-based variables, while the Compare subroutine is used to determine if acoustic switch 20 should activate triacs 66 and 68 when operating in the away/intruder mode. The Compare subroutine compares the impulse variable to a threshold value of 0.4 volts. When the impulse variable is greater than the threshold value four or more times in a one second interval, an actionable noise has been detected and the triac flags are set so that the triacs will be activated.

The Mode subroutine determines if acoustic switch 20 is operating in normal mode or away/intruder mode. In normal mode, the program exits from the subroutine without performing further steps. In away/intruder mode, the program examines the activate flag from the Compare subroutine to determine if the triacs should be turned ON. If the triacs are already ON and the Compare subroutine did not set the activate flag during the last three and a half minutes, the triacs are turned OFF. If the Compare subroutine sets the activate flag while the triacs are ON, the three and a half minute timer is reset. Finally, if the fifteen minute timer expires, the Mode subroutine turns the triacs OFF and keeps them OFF for one full second before allowing them to be operated by another noise.

The Fsound subroutine is executed after the completion of the Read subroutine. At this point, the program reads the voltage level from the output of peak detector 56 and compares it to a stored threshold value of 1.28 volts, which is the voltage that would be produced when sound detector 50 produces a 466 microvolt output voltage in response to a clap. If the sampled voltage is greater than the threshold voltage, timing counters used to time clap sequences are loaded if this is the first detected clap; otherwise, the time of occurrence from the first detected clap is stored.

One timing counter is used to time the 1.5 clap window. Another timing counter is used to ensure that after a sound above the threshold level is detected, the program will wait 200 milliseconds before further evaluating the sampled voltage level from peak detector 56. After the 200 millisecond period expires, the sampled voltage level is compared to a calculated voltage value that is 2 volts less than the maximum amplitude. If the sampled voltage is greater than the calculated value at any two points in time after the 200 millisecond period and before the occurrence of the next clap, the first sound is presumed to be noise and is not counted as a clap.

When the timing register tracking the 1.5 second clap window expires, the clap separation time is calculated in the Fsound subroutine. The separation time is used to determine if a sequence of claps are properly separated so that acoustic switch 20 operates power switch 66 or 68. If two claps were counted during the clap window, the separation time is 584 milliseconds. If three or four claps were counted, the shortest time difference between any two of the claps is the clap separation time.

At this point, because of timing considerations, the program returns to the main loop even though there are more calculations to be made in determining if an actionable sequence of claps was detected. The remaining code for clap detection is executed at the end of the Asound routine.

The main timing consideration that prevents the Fsound routine from completely evaluating whether or not an actionable clap sequence is detected is that the Toggle subroutine needs to be executed at this point to ensure any ON triacs continue to operate. After the Toggle subroutine is complete, the Read subroutine is executed again. Finally, the Asound subroutine is executed.

The Asound subroutine reads the voltage level from the output of peak detector 54 and calculates the short attack and long attack envelopes previously discussed. The difference between the two envelopes is referred to as the impulse and is used in the Compare subroutine. After calculating the impulse, the Asound subroutine completes calculations that determine if an actionable series of claps is detected when the clap window expires. The rules to invert a triac flag and thus operate a triac are as follows. If two claps are detected that are separated by 584±217 milliseconds and default acoustic signal selector 64 is in position 1, the flag for triac 66 is inverted. If three claps are detected that are separated by the calculated separation time ±217 milliseconds, then the flag for triac 66 is inverted if default acoustic signal selector 64 is in position 1. If it is in position 2, the flag for triac 68 is inverted. Finally, if four claps are detected that are separated by the calculated separation time ±217 milliseconds, then the flag for triac 68 is inverted if default acoustic signal selector 64 is in position 2. Otherwise, the clap sequence is incorrect and no action occurs. After determining if a triac flag should be inverted, the program returns to the first line of the main loop to execute the Toggle routine and the this loop continues indefinitely.

Other embodiments of the present invention include an embodiment in which mode selector switch 42 is a three position switch that allows as user to set the acoustic switch in a learn mode in addition to normal and away/intruder modes. Using learn mode, a person could program the acoustic switch to operate on different, user-chosen sequences. For example, four evenly spaced claps could operate a first appliance while two claps, a pause, and a third clap could operate a second appliance.

The default acoustic signal selector used within this embodiment would still allow a user to choose between a default selection of two claps and three claps for operating the first and second appliances, respectively, or a default selection of three claps and four claps for operating the same two appliances. But the default clap sequences are the selected series of acoustic signals that operate the acoustic switch only in the event that the acoustic switch's learn mode is not utilized.

A beeper could be employed to give an audible indication when the acoustic switch is in learn mode and has successfully learned a new clap sequence that will operate either the first or second appliance. The beeper could also be used in away/intruder mode to signal when acoustic switch 20 is about to turn an appliance OFF. Thus, if a person is in the vicinity, he/she could make any noise that would ensure that acoustic switch 20 continues to supply power to the appliance.

A timer could also be employed in normal operating mode to switch an appliance OFF if after a set period of time no noise is detected by acoustic switch 20. This would allow acoustic switch 20 to turn OFF an appliance such as a light when the user of the light walks out of the room and no longer uses the light. And as described above, a beeper could be used to signal when acoustic switch 20 is about to turn the appliance OFF. Additionally, acoustic switch 20 could rapidly turn the appliance ON and OFF to indicate that it is about to turn the appliance OFF.

Having fully described one embodiment of the present invention and several alternatives to that embodiment, many other equivalent or alternative methods of independently operating two or more appliances by an acoustic switch will be apparent to those skilled in the art. These equivalents and alternatives are intended to be included within the scope of the present invention.

APPENDIX A

Assembler Listing for ROM Source Code of One
Embodiment of Program Stored in Microcontroller 58

```
ST6 MACRO-ASSEMBLER version 3.01  - August 1990

Copyright 1993 Joseph Enterprises

--- SOURCE FILE : smclp3.asm ---
 1
 2 x          .def      080h
 3 y          .def      081h
 4 v          .def      082h
 5 w          .def      083h
 6 a          .def      0ffh,m
 7 adat       .def      0d0h
 8 acr        .def      0d1h
 9 ddra       .def      0c4h
10 dra        .def      0c0h
11 ora        .def      0cch
12 ddrb       .def      0c5h
13 drb        .def      0c1h
14 orb        .def      0cdh
15 wdt        .def      0d8h
16 tscr       .def      0d4h
17 tcr        .def      0d3h
18 ior        .def      0c8h
19 flag       .def      084h
20 fenv       .def      085h
21 tempx      .def      086h
22 asnd       .def      087h
23 aenv       .def      088h
24 fpk        .def      089h
25 apul       .def      08ah
26 apk        .def      08bh
27 ecntr      .def      08ch
28 flpk       .def      08dh
29 flenv      .def      08eh
30 fpulh      .def      08fh
31 alenv      .def      090h
32 tcntr      .def      091h
33 apulh      .def      092h
34 fsnd       .def      093h
35 alpk       .def      094h
36 dup        .def      095h
37 mod        .def      096h
38 fcntr      .def      097h
39 acntr      .def      098h
40 toggle     .def      099h
41 tmin       .def      09ah
42 cyc        .def      09bh   ;cyc
43 sec        .def      09ch
44 bcntrh     .def      09dh
45 bcntrl     .def      09eh
46 cltmer     .def      09fh
47 sflag      .def      0a0h
48 diff       .def      0a1h
49 dpk        .def      0a2h
50 word       .def      0a3h
51 fimp       .def      0a4h
52 aimp       .def      0a5h
53 tempa      .def      0a6h,m
54 tim        .def      0a7h
```

```
 55                                     55 secb       .def      0a8h
 56                                     56 tcntrb     .def      0a9h
 57                                     57 cltmerb    .def      0aah
 58                                     58 toggleb    .def      0abh
 59                                     59 bcntrlb    .def      0ach
 60                                     60 cntrlb     .def      0adh,m
 61                                     61 cltb       .def      0aeh
 62                                     62 cltab      .def      0afh
 63                                     63 tolb       .def      0b0h
 64                                     64 cltmerc    .def      0b1h
 65                                     65 imptim     .def      0b2h
 66                                     66 impcntr    .def      0b3h
 67                                     67 nflg       .def      0b8h
 68                                     68 fdiff      .def      0b9h
 69                                     69 ncntr      .def      0bah
 70                                     70 delt       .def      0bbh
 71                                     71 floor      .def      0bch
 72                                     72 max        .def      0bdh
 73                                     73 dead       .def      0beh
 74                                     74            .org      0880h
 75 P00 0880 0DC4FF P00 0880            75 start      ldi       ddra,255
 76 P00 0883 0DCCFF P00 0883            76            ldi       ora,255
 77 P00 0886 0DC0FF P00 0886            77            ldi       dra,255
 78 P00 0889 0DC500 P00 0889            78            ldi       ddrb,0
 79 P00 088C 0DC18F P00 088C            79            ldi       drb,143

 80 P00 088F 0DCD00 P00 088F            80            ldi       orb,0
 81 P00 0892 0DD110 P00 0892            81            ldi       acr,16
 82 P00 0895 0DD400 P00 0895            82            clr       tscr
 83 P00 0898 0DC800 P00 0898            83            ldi       ior,0
 84 P00 089B 4D     P00 089B            84            reti
 85 P00 089C 0DD8FE P00 089C            85            ldi       wdt,254
 86 P00 089F 8B84   P00 089F            86            res       1,flag
 87 P00 08A1 4B84   P00 08A1            87            res       2,flag
 88 P00 08A3 CB84   P00 08A3            88            res       3,flag
 89 P00 08A5 2B84   P00 08A5            89            res       4,flag
 90 P00 08A7 AB84   P00 08A7            90            res       5,flag
 91 P00 08A9 6B84   P00 08A9            91            res       6,flag
 92 P00 08AB EB84   P00 08AB            92            res       7,flag
 93 P00 08AD 0D8500 P00 08AD            93            clr       fenv
 94 P00 08B0 0D8800 P00 08B0            94            clr       aenv
 95 P00 08B3 0D9000 P00 08B3            95            clr       alenv
 96 P00 08B6 0D8E00 P00 08B6            96            clr       flenv
 97 P00 08B9 0D9300 P00 08B9            97            clr       fsnd
 98 P00 08BC 0D8700 P00 08BC            98            clr       asnd
 99 P00 08BF 0BA0   P00 08BF            99            res       0,sflag
100 P00 08C1 8BA0   P00 08C1           100            res       1,sflag
101 P00 08C3 4BA0   P00 08C3           101            res       2,sflag
102 P00 08C5 2BA0   P00 08C5           102            res       4,sflag
103 P00 08C7 EBA0   P00 08C7           103            res       7,sflag
104 P00 08C9 0BB8   P00 08C9           104            res       0,nflg
105 P00 08CB 4BB8   P00 08CB           105            res       2,nflg
106 P00 08CD 8BB8   P00 08CD           106            res       1,nflg
107 P00 08CF ABB8   P00 08CF           107            res       5,nflg
108 P00 08D1 0DBD00 P00 08D1           108            clr       max
109 P00 08D4 0DBE3C P00 08D4           109            ldi       dead,60
110 P00 08D7 0DBA00 P00 08D7           110            clr       ncntr
111 P00 08DA 0DA300 P00 08DA           111            clr       word
112 P00 08DD 0D9A00 P00 08DD           112            clr       tmin
113 P00 08E0 0D96FF P00 08E0           113            ldi       mod,255
114 P00 08E3 0D9F00 P00 08E3           114            clr       cltmer
115 P00 08E6 0D9100 P00 08E6           115            clr       tcntr
116 P00 08E9 F1C6   P00 08E9           116            call      line   ;50/60Hz
detection subroutine
117                                    117
118                                    118
119 P00 08EB 8196   P00 08EB           119 loop       call      tog
120 P00 08ED 5191   P00 08ED           120            call      read
121 P00 08EF 0DCD08 P00 08EF           121            ldi       orb,8
```

```
P00 08F2 BBD1   P00 08F2
P00 08F4 F1AA   P00 08F4
P00 08F6 1FD1   P00 08F6
P00 08F8 63FFFB P00 08F8
P00 08FB 1FD0   P00 08FB
P00 08FD 9F93   P00 08FD
P00 08FF 8196   P00 08FF
P00 0901 5191   P00 0901
P00 0903 0DCD04 P00 0903
P00 0906 BBD1   P00 0906
P00 0908 A1B8   P00 0908
P00 090A 1FD1   P00 090A
P00 090C 63FFFB P00 090C
P00 090F 1FD0   P00 090F
P00 0911 9F87   P00 0911
P00 0913 B98E   P00 0913
P00 0915 0DD8FE P00 0915
P00 0918 E3C12D P00 0918
P00 091B 038427 P00 091B
P00 091E 0B84   P00 091E
P00 0920 1FAB   P00 0920
;from LINE instead of absolute
P00 0922 9F99   P00 0922
P00 0924 8196   P00 0924
P00 0926 0DCD02 P00 0926
P00 0929 BBD1   P00 0929
P00 092B C19B   P00 092B
P00 092D 03A002 P00 092D
P00 0930 FF9F   P00 0930
P00 0932 838402 P00 0932
P00 0935 FF91   P00 0935
P00 0937 1FD1   P00 0937
P00 0939 63FFFB P00 0939
P00 093C 1FD0   P00 093C
P00 093E 3704   P00 093E
P00 0940 12     P00 0940
P00 0941 1704   P00 0941
P00 0943 9FA7   P00 0943
P00 0945 8196   P00 0945
P00 0947 CD     P00 0947
P00 0948 13841A P00 0948
P00 094B 1B84   P00 094B
P00 094D 1FAB   P00 094D
;from LINE
P00 094F 9F99   P00 094F
P00 0951 8196   P00 0951
P00 0953 0DCD01 P00 0953
P00 0956 BBD1   P00 0956
P00 0958 819D   P00 0958
P00 095A 1198   P00 095A
P00 095C 1FD1   P00 095C
P00 095E 63FFFB P00 095E
P00 0961 1FD0   P00 0961
P00 0963 9F96   P00 0963
P00 0965 8196   P00 0965
P00 0967 CD     P00 0967
```

```
              set         5,acr
              call        fsound
      ld      ld          a,acr
              jrr         6,a,ld
              ld          a,adat
              ld          fsnd,a
              call        tog
              call        read
              ldi         orb,4
              set         5,acr
              call        asound
      lp      ld          a,acr
              jrr         6,a,lp
              ld          a,adat
              ld          asnd,a
              jp          loop
      read    ldi         wdt,254
              jrr         7,drb,rn
              jrr         0,flag,rpd
              res         0,flag
              ld          a,toggleb
              ld          toggle,a
              call        tog
              ldi         orb,2
              set         5,acr
              call        time
              jrr         0,sflag,rpb
              dec         cltmer
      rpb     jrr         1,flag,rpc
              dec         tcntr
      rpc     ld          a,acr
              jrr         6,a,rpc
              ld          a,adat
              cpi         a,4
              jrnc        rpca
              ldi         a,4
      rpca    ld          tim,a
      rpd     call        tog
              ret
      rn      jrs         0,flag,rnp
              set         0,flag
              ld          a,toggleb
              ld          toggle,a
              call        tog
              ldi         orb,1
              set         5,acr
              call        mode
              call        comp
      rnd     ld          a,acr
              jrr         6,a,rnd
              ld          a,adat
              ld          mod,a
      rnp     call        tog
              ret
```

```
P00 0968 1F99   P00 0968
P00 096A 08     P00 096A
P00 096B CD     P00 096B
P00 096C 438406 P00 096C
P00 096F 0DC0F3 P00 096F
P00 0972 0DC0FF P00 0972
P00 0975 C38406 P00 0975
P00 0978 0DC0FC P00 0978
P00 097B 0DC0FF P00 097B
P00 097E FF99   P00 097E
P00 0980 CD     P00 0980

P00 0981 1FBE   P00 0981
P00 0983 14     P00 0983
P00 0984 A99A   P00 0984
P00 0986 1FA5   P00 0986
P00 0988 3714   P00 0988
P00 098A 42     P00 098A
P00 098B 1FB2   P00 098B
P00 098D 10     P00 098D
P00 098E 599A   P00 098E
P00 0990 FFB2   P00 0990
P00 0992 CD     P00 0992
P00 0993 1FB3   P00 0993
P00 0995 38     P00 0995
P00 0996 0DB301 P00 0996
P00 0999 0DB23C P00 0999
P00 099C CD     P00 099C
P00 099D 1FB2   P00 099D
P00 099F 2C     P00 099F
P00 09A0 FFB2   P00 09A0
P00 09A2 7FB3   P00 09A2
P00 09A4 CD     P00 09A4
P00 09A5 1FB3   P00 09A5
P00 09A7 3704   P00 09A7
P00 09A9 4A     P00 09A9
P00 09AA EB84   P00 09AA
P00 09AC 0DB300 P00 09AC
P00 09AF 0DB200 P00 09AF
P00 09B2 CD     P00 09B2
P00 09B3 FB84   P00 09B3
P00 09B5 0DB300 P00 09B5
P00 09B8 0DB200 P00 09B8
P00 09BB CD     P00 09BB
```

```
tog      ld      a,toggle
         jrnz    toga
         ret
toga     jrr     2,flag,togd
         ldi     dra,243
         ldi     dra,255
togd     jrr     3,flag,togn
         ldi     dra,252
         ldi     dra,255
togn     dec     toggle
         ret

comp     ld      a,dead
         jrz     compa
         jp      compna
compa    ld      a,aimp
         cpi     a,20
         jrnc    compd
         ld      a,imptim
         jrnz    compb
         jp      compn
compb    dec     imptim
         ret
compd    ld      a,impcntr
         jrnz    compf
         ldi     impcntr,1
         ldi     imptim,60
         ret
compf    ld      a,imptim
         jrz     compn
         dec     imptim
         inc     impcntr
         ret
compn    ld      a,impcntr
         cpi     a,4
         jrnc    compp
compna   res     7,flag
         clr     impcntr
         clr     imptim
         ret
compp    set     7,flag
         clr     impcntr
         clr     imptim
         ret
```

```
258                              258
259                              259
260                              260
261                              261
262                              262
263                              263
264                              264
265                              265
266                              266
267                              267
268                              268
269 P00 09BC 1FBE   P00 09BC     269 time    ld     a,dead
;transfer
270 P00 09BE 14     P00 09BE     270         jrz    tia
271 P00 09BF FFBE   P00 09BF     271         dec    dead
272 P00 09C1 FF9B   P00 09C1     272 tia     dec    cyc
273 P00 09C3 0C     P00 09C3     273         jrz    tid
274 P00 09C4 CD     P00 09C4     274         ret
275 P00 09C5 1FBD   P00 09C5     275 tid     ld     a,max
276 P00 09C7 14     P00 09C7     276         jrz    tin
277 P00 09C8 FFBD   P00 09C8     277         dec    max
278 P00 09CA FF9C   P00 09CA     278 tin     dec    sec
279 P00 09CC 0C     P00 09CC     279         jrz    tip
280 P00 09CD CD     P00 09CD     280         ret
281 P00 09CE 1FA8   P00 09CE     281 tip     ld     a,secb  ;from
LINE
282 P00 09D0 9F9C   P00 09D0     282         ld     sec,a
283 P00 09D2 1F9A   P00 09D2     283         ld     a,tmin
284 P00 09D4 14     P00 09D4     284         jrz    tiz
285 P00 09D5 FF9A   P00 09D5     285         dec    tmin
286 P00 09D7 CD     P00 09D7     286 tiz     ret
287                              287
288                              288
289                              289
290                              290
291                              291
292                              292
293                              293
294                              294
295                              295
296                              296
297                              297
298                              298
299                              299
300                              300
301                              301
302                              302
303                              303
304                              304
305                              305
306 P00 09D8 1F96   P00 09D8     306 mode    ld     a,mod
307 P00 09DA 338405 P00 09DA     307         jrs    4,flag,moda
308 P00 09DD 3770   P00 09DD     308         cpi    a,112
309 P00 09DF 3A     P00 09DF     309         jrnc   mnorm
310 P00 09E0 69A6   P00 09E0     310         jp     maway
311 P00 09E2 3790   P00 09E2     311 moda    cpi    a,144
312 P00 09E4 12     P00 09E4     312         jrnc   mnorm
313 P00 09E5 69A6   P00 09E5     313         jp     maway
314 P00 09E7 2B84   P00 09E7     314 mnorm   res    4,flag
315 P00 09E9 EBA0   P00 09E9     315         res    7,sflag
316 P00 09EB A3C10C P00 09EB     316         jrr    5,drb,mnx
;option
317 P00 09EE ABB8   P00 09EE     317         res    5,nflg
318 P00 09F0 0DBD00 P00 09F0     318         clr    max
319 P00 09F3 0DBE3C P00 09F3     319         ldi    dead,60
320 P00 09F6 0D9A00 P00 09F6     320         clr    tmin
321 P00 09F9 CD     P00 09F9     321         ret
322 P00 09FA 738404 P00 09FA     322 mnx     jrs    6,flag,mna
323 P00 09FD 1F84   P00 09FD     323         ld     a,flag
```

```
 324 P00 09FF 9F95   P00 09FF     324            ld        dup,a
 325 P00 0A01 539504 P00 0A01     325 mna        jrs       2,dup,mnd
 326 P00 0A04 D39501 P00 0A04     326            jrs       3,dup,mnd
 327 P00 0A07 CD     P00 0A07     327            ret
 328 P00 0A08 E38419 P00 0A08     328 mnd        jrr       7,flag,mnf
 329 P00 0A0B 1FA8   P00 0A0B     329            ld        a,secb
 330 P00 0A0D 9F9C   P00 0A0D     330            ld        sec,a
 331 P00 0A0F 1FA7   P00 0A0F     331            ld        a,tim
 332 P00 0A11 9F9A   P00 0A11     332            ld        tmin,a
 333 P00 0A13 439502 P00 0A13     333            jrr       2,dup,mndc
 334 P00 0A16 5B84   P00 0A16     334            set       2,flag
 335 P00 0A18 0D9D02 P00 0A18     335 mndc       ldi       bcntrh,2
 336 P00 0A1B 1FAC   P00 0A1B     336            ld        a,bcntrlb
;from LINE
 337 P00 0A1D 9F9E   P00 0A1D     337            ld        bcntrl,a
 338 P00 0A1F AB84   P00 0A1F     338            res       5,flag
 339 P00 0A21 6B84   P00 0A21     339            res       6,flag
 340 P00 0A23 CD     P00 0A23     340            ret
 341 P00 0A24 B38431 P00 0A24     341 mnf        jrs       5,flag,mnt
 342 P00 0A27 1F9A   P00 0A27     342            ld        a,tmin
 343 P00 0A29 3701   P00 0A29     343            cpi       a,1
 344 P00 0A2B 28     P00 0A2B     344            jrnz      mnfa
 345 P00 0A2C 1F9C   P00 0A2C     345            ld        a,sec
 346 P00 0A2E 3701   P00 0A2E     346            cpi       a,1
 347 P00 0A30 0C     P00 0A30     347            jrz       mng
 348 P00 0A31 CD     P00 0A31     348 mnfa       ret
 349 P00 0A32 7B84   P00 0A32     349 mng        set       6,flag
 350 P00 0A34 1F9E   P00 0A34     350            ld        a,bcntrl
 351 P00 0A36 30     P00 0A36     351            jrnz      mnn
 352 P00 0A37 1FAC   P00 0A37     352            ld        a,bcntrlb
;from LINE
 353 P00 0A39 9F9E   P00 0A39     353            ld        bcntrl,a
 354 P00 0A3B FF9D   P00 0A3B     354            dec       bcntrh
 355 P00 0A3D 1F9E   P00 0A3D     355 mnn        ld        a,bcntrl
 356 P00 0A3F 3FAD   P00 0A3F     356            cp        a,cntrlb   ;from
LINE
 357 P00 0A41 3E     P00 0A41     357            jrc       mnp
 358 P00 0A42 439509 P00 0A42     358            jrr       2,dup,mnr
 359 P00 0A45 5B84   P00 0A45     359            set       2,flag
 360 P00 0A47 E9A4   P00 0A47     360 mnnb       jp        mnr
 361 P00 0A49 439502 P00 0A49     361 mnp        jrr       2,dup,mnr
 362 P00 0A4C 4B84   P00 0A4C     362            res       2,flag
 363 P00 0A4E FF9E   P00 0A4E     363 mnr        dec       bcntrl
 364 P00 0A50 1F9D   P00 0A50     364            ld        a,bcntrh
 365 P00 0A52 20     P00 0A52     365            jrnz      mns
 366 P00 0A53 BB84   P00 0A53     366            set       5,flag
 367 P00 0A55 6B84   P00 0A55     367            res       6,flag
 368 P00 0A57 CD     P00 0A57     368 mns        ret
 369 P00 0A58 1F9A   P00 0A58     369 mnt        ld        a,tmin
 370 P00 0A5A 50     P00 0A5A     370            jrnz      mnu
 371 P00 0A5B 4B84   P00 0A5B     371            res       2,flag
 372 P00 0A5D CB84   P00 0A5D     372            res       3,flag
 373 P00 0A5F AB84   P00 0A5F     373            res       5,flag
 374 P00 0A61 6B84   P00 0A61     374            res       6,flag
 375 P00 0A63 EBA0   P00 0A63     375            res       7,sflag
 376 P00 0A65 CD     P00 0A65     376 mnu        ret
 377                              377
 378                              378
 379                              379
 380 P00 0A66 3B84   P00 0A66     380 maway      set       4,flag
 381 P00 0A68 FBA0   P00 0A68     381            set       7,sflag
 382 P00 0A6A 1FBE   P00 0A6A     382            ld        a,dead
 383 P00 0A6C 3C     P00 0A6C     383            jrz       mab
 384 P00 0A6D 4B84   P00 0A6D     384            res       2,flag
 385 P00 0A6F CB84   P00 0A6F     385            res       3,flag
 386 P00 0A71 EB84   P00 0A71     386            res       7,flag
 387 P00 0A73 CD     P00 0A73     387            ret
 388 P00 0A74 E38418 P00 0A74     388 mab        jrr       7,flag,mad
 389 P00 0A77 5B84   P00 0A77     389            set       2,flag
```

```
390 P00 0A79 DB84   P00 0A79      390               set        3,flag
391 P00 0A7B 1FA8   P00 0A7B      391               ld         a,secb
392 P00 0A7D 9F9C   P00 0A7D      392               ld         sec,a
393 P00 0A7F 1FA7   P00 0A7F      393               ld         a,tim
394 P00 0A81 9F9A   P00 0A81      394               ld         tmin,a
395 P00 0A83 B3B819 P00 0A83      395               jrs        5,nflg,maf
396 P00 0A86 BBB8   P00 0A86      396               set        5,nflg
397 P00 0A88 0DBDD2 P00 0A88      397               ldi        max,210
398 P00 0A8B 0DBE00 P00 0A8B      398               clr        dead
399 P00 0A8E CD     P00 0A8E      399               ret
400 P00 0A8F 1F9A   P00 0A8F      400 mad           ld         a,tmin
401 P00 0A91 68     P00 0A91      401               jrnz       maf
402 P00 0A92 4B84   P00 0A92      402               res        2,flag
403 P00 0A94 CB84   P00 0A94      403               res        3,flag
404 P00 0A96 ABB8   P00 0A96      404               res        5,nflg
405 P00 0A98 0DBD00 P00 0A98      405               clr        max
406 P00 0A9B 0DBE00 P00 0A9B      406               clr        dead
407 P00 0A9E CD     P00 0A9E      407               ret
408 P00 0A9F 1FBD   P00 0A9F      408 maf           ld         a,max
409 P00 0AA1 60     P00 0AA1      409               jrnz       man
410 P00 0AA2 0DBE3C P00 0AA2      410               ldi        dead,60
411 P00 0AA5 4B84   P00 0AA5      411               res        2,flag
412 P00 0AA7 CB84   P00 0AA7      412               res        3,flag
413 P00 0AA9 ABB8   P00 0AA9      413               res        5,nflg
414 P00 0AAB 0D9A00 P00 0AAB      414               clr        tmin
415 P00 0AAE CD     P00 0AAE      415 man           ret
416                               416
417                               417
418                               418
419                               419
420                               420
421                               421
422                               422
423                               423
424                               424
425                               425
426 P00 0AAF 1F93   P00 0AAF      426 fsound        ld         a,fsnd
427 P00 0AB1 9F8E   P00 0AB1      427               ld         flenv,a
428 P00 0AB3 11B5   P00 0AB3      428               call       track
429 P00 0AB5 1F8E   P00 0AB5      429 fcomp         ld         a,flenv
430 P00 0AB7 E3A009 P00 0AB7      430               jrr        7,sflag,fce
;from MODE
431 P00 0ABA 8B84   P00 0ABA      431               res        1,flag
432 P00 0ABC 0D9100 P00 0ABC      432               clr        tcntr
433 P00 0ABF 0D9F00 P00 0ABF      433               clr        cltmer
434 P00 0AC2 CD     P00 0AC2      434               ret
435 P00 0AC3 938424 P00 0AC3      435 fce           jrs        1,flag,fcp
436 P00 0AC6 1F8E   P00 0AC6      436               ld         a,flenv
437 P00 0AC8 3740   P00 0AC8      437               cpi        a,64
438 P00 0ACA 12     P00 0ACA      438               jrnc       fcea
439 P00 0ACB 49AE   P00 0ACB      439               jp         fcn
440 P00 0ACD 9FB9   P00 0ACD      440 fcea          ld         fdiff,a
441 P00 0ACF 1F9F   P00 0ACF      441               ld         a,cltmer
442 P00 0AD1 2C     P00 0AD1      442               jrz        fcf
443 P00 0AD2 3FA9   P00 0AD2      443               cp         a,tcntrb ;from
LINE
444 P00 0AD4 12     P00 0AD4      444               jrnc       fcf
445 P00 0AD5 A9AE   P00 0AD5      445               jp         fcp
446 P00 0AD7 9B84   P00 0AD7      446 fcf           set        1,flag
447 P00 0AD9 1BB8   P00 0AD9      447               set        0,nflg
448 P00 0ADB 5BB8   P00 0ADB      448               set        2,nflg
449 P00 0ADD 7BA0   P00 0ADD      449               set        6,sflag
450 P00 0ADF 1FA9   P00 0ADF      450               ld         a,tcntrb
;from LINE
451 P00 0AE1 9F91   P00 0AE1      451               ld         tcntr,a
452 P00 0AE3 CD     P00 0AE3      452               ret
453 P00 0AE4 8B84   P00 0AE4      453 fcn           res        1,flag
454 P00 0AE6 6BA0   P00 0AE6      454               res        6,sflag
455 P00 0AE8 19B3   P00 0AE8      455               jp         fsend
```

```
 456 P00 0AEA 1F91   P00 0AEA      456 fcp      ld      a,tcntr
 457 P00 0AEC 0C     P00 0AEC      457          jrz     fcz
 458 P00 0AED CD     P00 0AED      458          ret
 459 P00 0AEE 8B84   P00 0AEE      459 fcz      res     1,flag
 460 P00 0AF0 0BB8   P00 0AF0      460          res     0,nflg
 461 P00 0AF2 63A03C P00 0AF2      461          jrr     6,sflag,fsend
 462                               462
 463                               463
 464                               464
 465                               465
 466                               466
 467 P00 0AF5 13A01C P00 0AF5      467 fstore   jrs     0,sflag,fstd
 468 P00 0AF8 1BA0   P00 0AF8      468          set     0,sflag
 469 P00 0AFA 23C106 P00 0AFA      469          jrr     4,drb,fsta
 470 P00 0AFD 1FAA   P00 0AFD      470          ld      a,cltmerb
;from LINE
 471 P00 0AFF 9F9F   P00 0AFF      471          ld      cltmer,a
 472 P00 0B01 79B0   P00 0B01      472          jp      fstb
 473 P00 0B03 1FB1   P00 0B03      473 fsta     ld      a,cltmerc
 474 P00 0B05 9F9F   P00 0B05      474          ld      cltmer,a
 475 P00 0B07 0D81B4 P00 0B07      475 fstb     ldi     y,180
 476 P00 0B0A 1F9B   P00 0B0A      476          ld      a,cyc
 477 P00 0B0C 9FA1   P00 0B0C      477          ld      diff,a
 478 P00 0B0E 0DA2FF P00 0B0E      478          ldi     dpk,255
 479 P00 0B11 9BA3   P00 0B11      479          set     1,word
 480 P00 0B13 CD     P00 0B13      480          ret
 481 P00 0B14 1FA1   P00 0B14      481 fstd     ld      a,diff
 482 P00 0B16 DF9B   P00 0B16      482          sub     a,cyc
 483 P00 0B18 3FA2   P00 0B18      483          cp      a,dpk
 484 P00 0B1A 12     P00 0B1A      484          jrnc    fstf
 485 P00 0B1B 9FA2   P00 0B1B      485          ld      dpk,a
 486 P00 0B1D 8F     P00 0B1D      486 fstf     ld      (y),a
 487 P00 0B1E 75     P00 0B1E      487          ld      a,y
 488 P00 0B1F 37B7   P00 0B1F      488          cpi     a,183
 489 P00 0B21 0A     P00 0B21      489          jrnc    fstg
 490 P00 0B22 55     P00 0B22      490          inc     y
 491 P00 0B23 1F9B   P00 0B23      491 fstg     ld      a,cyc
 492 P00 0B25 9FA1   P00 0B25      492          ld      diff,a
 493 P00 0B27 1F9F   P00 0B27      493          ld      a,cltmer
 494 P00 0B29 3FAE   P00 0B29      494          cp      a,cltb    ;from
LINE
 495 P00 0B2B 22     P00 0B2B      495          jrnc    fsth
 496 P00 0B2C 5FAF   P00 0B2C      496          add     a,cltab   ;from
LINE
 497 P00 0B2E 9F9F   P00 0B2E      497          ld      cltmer,a
 498 P00 0B30 CD     P00 0B30      498 fsth     ret
 499                               499
 500                               500
 501                               501
 502 P00 0B31 03A01C P00 0B31      502 fsend    jrr     0,sflag,fsendx
 503 P00 0B34 1F9F   P00 0B34      503          ld      a,cltmer
 504 P00 0B36 0C     P00 0B36      504          jrz     fsa
 505 P00 0B37 CD     P00 0B37      505          ret
 506 P00 0B38 0BA0   P00 0B38      506 fsa      res     0,sflag
 507 P00 0B3A 4BB8   P00 0B3A      507          res     2,nflg
 508 P00 0B3C 93B80F P00 0B3C      508          jrs     1,nflg,fsb

 509 P00 0B3F 75     P00 0B3F      509          ld      a,y
 510 P00 0B40 37B4   P00 0B40      510          cpi     a,180
 511 P00 0B42 10     P00 0B42      511          jrnz    fsaa
 512 P00 0B43 09B5   P00 0B43      512          jp      fsendx
 513 P00 0B45 9BA0   P00 0B45      513 fsaa     set     1,sflag
 514 P00 0B47 37B5   P00 0B47      514          cpi     a,181
 515 P00 0B49 30     P00 0B49      515          jrnz    fsendx
 516 P00 0B4A 1FAF   P00 0B4A      516          ld      a,cltab   ;from
LINE
 517 P00 0B4C 9FA2   P00 0B4C      517          ld      dpk,a
 518 P00 0B4E 8BB8   P00 0B4E      518 fsb      res     1,nflg
 519 P00 0B50 CD     P00 0B50      519 fsendx   ret
```

```
P00 0B51 03B816 P00 0B51   track  jrr   0,nflg,trn
P00 0B54 0DBA00 P00 0B54   trca   clr   ncntr
P00 0B57 1F8E   P00 0B57          ld    a,flenv
P00 0B59 3FB9   P00 0B59          cp    a,fdiff
P00 0B5B 16     P00 0B5B          jrc   tra
P00 0B5C 9FB9   P00 0B5C          ld    fdiff,a
P00 0B5E 1FB9   P00 0B5E   tra    ld    a,fdiff
P00 0B60 3792   P00 0B60          cpi   a,146
P00 0B62 12     P00 0B62          jrnc  trb
P00 0B63 1792   P00 0B63          ldi   a,146
P00 0B65 D782   P00 0B65   trb    subi  a,130
P00 0B67 9FBC   P00 0B67          ld    floor,a
P00 0B69 CD     P00 0B69   trd    ret

P00 0B6A 43B81C P00 0B6A   trn    jrr   2,nflg,trz
P00 0B6D 1F8E   P00 0B6D          ld    a,flenv
P00 0B6F 3FBB   P00 0B6F          cp    a,delt
P00 0B71 12     P00 0B71          jrnc  trna
P00 0B72 59B8   P00 0B72          jp    trp
P00 0B74 3708   P00 0B74   trna   cpi   a,8
P00 0B76 12     P00 0B76          jrnc  trnb
P00 0B77 59B8   P00 0B77          jp    trp
P00 0B79 3FBC   P00 0B79   trnb   cp    a,floor
P00 0B7B 4E     P00 0B7B          jrc   trp
P00 0B7C 7FBA   P00 0B7C          inc   ncntr
P00 0B7E 1FBA   P00 0B7E          ld    a,ncntr
P00 0B80 3710   P00 0B80          cpi   a,16
P00 0B82 16     P00 0B82          jrc   trp
P00 0B83 9BB8   P00 0B83          set   1,nflg
P00 0B85 1F8E   P00 0B85   trp    ld    a,flenv
P00 0B87 9FBB   P00 0B87          ld    delt,a
P00 0B89 CD     P00 0B89   trz    ret
```

```
589                                   589
590                                   590
591                                   591
592                                   592
593                                   593
594                                   594
595 P00 0B8A 1F98    P00 0B8A         595 asound   ld      a,acntr
596 P00 0B8C 54      P00 0B8C         596          jrz     asd
597 P00 0B8D FF98    P00 0B8D         597          dec     acntr
598 P00 0B8F 1F87    P00 0B8F         598          ld      a,asnd
599 P00 0B91 3F8B    P00 0B91         599          cp      a,apk
600 P00 0B93 16      P00 0B93         600          jrc     asb
601 P00 0B94 9F8B    P00 0B94         601          ld      apk,a
602 P00 0B96 CD      P00 0B96         602 asb      ret
603 P00 0B97 1F8C    P00 0B97         603 asd      ld      a,ecntr
604 P00 0B99 4C      P00 0B99         604          jrz     asg
605 P00 0B9A 1F8B    P00 0B9A         605          ld      a,apk
606 P00 0B9C 3F94    P00 0B9C         606          cp      a,alpk
607 P00 0B9E 16      P00 0B9E         607          jrc     asc
608 P00 0B9F 9F94    P00 0B9F         608          ld      alpk,a
609 P00 0BA1 89BA    P00 0BA1         609 asc      jp      asn
610 P00 0BA3 D1C3    P00 0BA3         610 asg      call    atrack
611 P00 0BA5 0D9400  P00 0BA5         611          clr     alpk
612 P00 0BA8 61C5    P00 0BA8         612 asn      call    anv
613 P00 0BAA 0D9804  P00 0BAA         613          ldi     acntr,4
614 P00 0BAD 0D8B00  P00 0BAD         614          clr     apk
615 P00 0BB0 1F90    P00 0BB0         615          ld      a,alenv
616 P00 0BB2 DF88    P00 0BB2         616          sub     a,aenv
617 P00 0BB4 22      P00 0BB4         617          jrnc    acd
618 P00 0BB5 0DA500  P00 0BB5         618          clr     aimp
619 P00 0BB8 CD      P00 0BB8         619          ret
620 P00 0BB9 9FA5    P00 0BB9         620 acd      ld      aimp,a
621 P00 0BBB F3A068  P00 0BBB         621          jrs     7,sflag,aclr
622 P00 0BBE 93A001  P00 0BBE         622          jrs     1,sflag,ashift
623 P00 0BC1 CD      P00 0BC1         623          ret
624 P00 0BC2 53A005  P00 0BC2         624 ashift   jrs     2,sflag,asha
625 P00 0BC5 5BA0    P00 0BC5         625          set     2,sflag
626 P00 0BC7 0D81B4  P00 0BC7         626          ldi     y,180
627 P00 0BCA 0F      P00 0BCA         627 asha     ld      a,(y)
628 P00 0BCB DFA2    P00 0BCB         628          sub     a,dpk
629 P00 0BCD 1A      P00 0BCD         629          jrnc    ashd
630 P00 0BCE 2D      P00 0BCE         630          com     a
631 P00 0BCF 7FFF    P00 0BCF         631          inc     a
632 P00 0BD1 3FB0    P00 0BD1         632 ashd     cp      a,tolb  ;from
LINE
633 P00 0BD3 22      P00 0BD3         633          jrnc    ashf
634 P00 0BD4 1BA3    P00 0BD4         634          set     0,word
635 P00 0BD6 A9BD    P00 0BD6         635          jp      ashn
636 P00 0BD8 0BA3    P00 0BD8         636 ashf     res     0,word
637 P00 0BDA 1FA3    P00 0BDA         637 ashn     ld      a,word
638 P00 0BDC 5FFF    P00 0BDC         638          sla     a
639 P00 0BDE 9FA3    P00 0BDE         639          ld      word,a
640 P00 0BE0 A3A358  P00 0BE0         640          jrr     5,word,aclrn
641 P00 0BE3 1FA3    P00 0BE3         641          ld      a,word
642 P00 0BE5 23C120  P00 0BE5         642          jrr     4,drb,ashr
643 P00 0BE8 3730    P00 0BE8         643          cpi     a,48
644 P00 0BEA 68      P00 0BEA         644          jrnz    ashp
645 P00 0BEB 538406  P00 0BEB         645          jrs     2,flag,ashna
646 P00 0BEE 5B84    P00 0BEE         646          set     2,flag
647 P00 0BF0 FB84    P00 0BF0         647          set     7,flag
648 P00 0BF2 69C2    P00 0BF2         648          jp      aclr
649 P00 0BF4 4B84    P00 0BF4         649 ashna    res     2,flag
650 P00 0BF6 69C2    P00 0BF6         650          jp      aclr
651 P00 0BF8 3738    P00 0BF8         651 ashp     cpi     a,56
652 P00 0BFA 58      P00 0BFA         652          jrnz    ashq
653 P00 0BFB D38406  P00 0BFB         653          jrs     3,flag,ashpa
654 P00 0BFE DB84    P00 0BFE         654          set     3,flag
655 P00 0C00 FB84    P00 0C00         655          set     7,flag
656 P00 0C02 69C2    P00 0C02         656          jp      aclr
```

```
P00 0C04 CB84   P00 0C04   ashpa    res    3,flag
P00 0C06 69C2   P00 0C06   ashq     jp     aclr
P00 0C08 3738   P00 0C08   ashr     cpi    a,56
P00 0C0A 68     P00 0C0A            jrnz   asht
P00 0C0B 538406 P00 0C0B            jrs    2,flag,ashra
P00 0C0E 5B84   P00 0C0E            set    2,flag
P00 0C10 FB84   P00 0C10            set    7,flag
P00 0C12 69C2   P00 0C12            jp     aclr
P00 0C14 4B84   P00 0C14   ashra    res    2,flag
P00 0C16 69C2   P00 0C16            jp     aclr
P00 0C18 373C   P00 0C18   asht     cpi    a,60
P00 0C1A 58     P00 0C1A            jrnz   aclr
P00 0C1B D38406 P00 0C1B            jrs    3,flag,ashta
P00 0C1E DB84   P00 0C1E            set    3,flag
P00 0C20 FB84   P00 0C20            set    7,flag
P00 0C22 69C2   P00 0C22            jp     aclr
P00 0C24 CB84   P00 0C24   ashta    res    3,flag
P00 0C26 0DA300 P00 0C26   aclr     clr    word
P00 0C29 0DA604 P00 0C29            ldi    tempa,4
P00 0C2C 0D81B4 P00 0C2C            ldi    y,180
P00 0C2F DFFF   P00 0C2F   aclrd    clr    a
P00 0C31 8F     P00 0C31            ld     (y),a
P00 0C32 55     P00 0C32            inc    y
P00 0C33 FFA6   P00 0C33            dec    tempa
P00 0C35 C8     P00 0C35            jrnz   aclrd
P00 0C36 8BA0   P00 0C36            res    1,sflag
P00 0C38 4BA0   P00 0C38            res    2,sflag
P00 0C3A CD     P00 0C3A            ret
P00 0C3B 55     P00 0C3B   aclrn    inc    y
P00 0C3C CD     P00 0C3C            ret
P00 0C3D 1F94   P00 0C3D   atrack   ld     a,alpk
P00 0C3F 3F88   P00 0C3F            cp     a,aenv
P00 0C41 52     P00 0C41            jrnc   atn
P00 0C42 1F88   P00 0C42            ld     a,aenv
P00 0C44 D708   P00 0C44            subi   a,8
P00 0C46 12     P00 0C46            jrnc   atd
P00 0C47 1700   P00 0C47            ldi    a,0
P00 0C49 9F88   P00 0C49   atd      ld     aenv,a
P00 0C4B CD     P00 0C4B            ret
P00 0C4C 1F88   P00 0C4C   atn      ld     a,aenv
P00 0C4E 5701   P00 0C4E            addi   a,1
P00 0C50 12     P00 0C50            jrnc   atp
P00 0C51 17FF   P00 0C51            ldi    a,255
P00 0C53 9F88   P00 0C53   atp      ld     aenv,a
P00 0C55 CD     P00 0C55            ret
P00 0C56 1F8B   P00 0C56   anv      ld     a,apk
```

```
 726 P00 0C58 3F90   P00 0C58      726              cp          a,alenv
 727 P00 0C5A 52     P00 0C5A      727              jrnc        anvn
 728 P00 0C5B 1F90   P00 0C5B      728              ld          a,alenv
 729 P00 0C5D D702   P00 0C5D      729              subi        a,2
 730 P00 0C5F 12     P00 0C5F      730              jrnc        anva
 731 P00 0C60 1700   P00 0C60      731              ldi         a,0
 732 P00 0C62 9F90   P00 0C62      732 anva         ld          alenv,a
 733 P00 0C64 CD     P00 0C64      733              ret
 734 P00 0C65 1F90   P00 0C65      734 anvn         ld          a,alenv
 735 P00 0C67 5708   P00 0C67      735              addi        a,8
 736 P00 0C69 12     P00 0C69      736              jrnc        anvp
 737 P00 0C6A 17FF   P00 0C6A      737              ldi         a,255
 738 P00 0C6C 9F90   P00 0C6C      738 anvp         ld          alenv,a
 739 P00 0C6E CD     P00 0C6E      739              ret
 740                               740
 741                               741
 742                               742
 743                               743
 744                               744
 745                               745
 746                               746
 747                               747
 748                               748
 749                               749
 750 P00 0C6F 0D8C78 P00 0C6F      750 line         ldi         ecntr,120
 ;read line freq. for 2 sec.
 751 P00 0C72 E3C1FD P00 0C72      751 linea        jrr         7,drb,linea
;start at leading edge
 752 P00 0C75 0DA600 P00 0C75      752              clr         tempa
 753 P00 0C78 0DD3FF P00 0C78      753 lined        ldi         tcr,255
 754 P00 0C7B 0DD438 P00 0C7B      754              ldi         tscr,56
 755 P00 0C7E E3C109 P00 0C7E      755 linef        jrr         7,drb,linen  ;2
Byte count at 2.167microsec. rate
 756 P00 0C81 1FD4   P00 0C81      756              ld          a,tscr
 757 P00 0C83 E3FFF8 P00 0C83      757              jrr         7,a,linef
 758 P00 0C86 7FA6   P00 0C86      758              inc         tempa
 759 P00 0C88 89C7   P00 0C88      759              jp          lined
 760 P00 0C8A 0DD8FE P00 0C8A      760 linen        ldi         wdt,254
 761 P00 0C8D FF8C   P00 0C8D      761              dec         ecntr  ;loop
until done
 762 P00 0C8F 14     P00 0C8F      762              jrz         linep
 763 P00 0C90 29C7   P00 0C90      763              jp          linea
 764 P00 0C92 CBD4   P00 0C92      764 linep        res         3,tscr  ;stop
counter
 765 P00 0C94 1FD3   P00 0C94      765              ld          a,tcr
 766 P00 0C96 2D     P00 0C96      766              com         a
 767 P00 0C97 37BE   P00 0C97      767              cpi         a,190  ;center
point 2 Byte compare
 768 P00 0C99 12     P00 0C99      768              jrnc        liner
 769 P00 0C9A FFA6   P00 0C9A      769              dec         tempa
 770 P00 0C9C 1FA6   P00 0C9C      770 liner        ld          a,tempa
 771 P00 0C9E 3710   P00 0C9E      771              cpi         a,16
 772 P00 0CA0 12     P00 0CA0      772              jrnc        lines  ;jp to
50hz. buffer loading
 773 P00 0CA1 89CC   P00 0CA1      773              jp          linet  ;jp to
60hz. buffer loading
 774 P00 0CA3 0DA802 P00 0CA3      774 lines        ldi         secb,2  ;buffer
registers to load timing reg.
 775 P00 0CA6 0D9C02 P00 0CA6      775              ldi         sec,2  ;instead
of absolute values
 776 P00 0CA9 0DA90A P00 0CA9      776              ldi         tcntrb,10
 777 P00 0CAC 0DAA4B P00 0CAC      777              ldi         cltmerb,75
 778 P00 0CAF 0DB164 P00 0CAF      778              ldi         cltmerc,100
 779 P00 0CB2 0DAB20 P00 0CB2      779              ldi         toggleb,32
 780 P00 0CB5 0DAC32 P00 0CB5      780              ldi         bcntrlb,50
 781 P00 0CB8 0DAD19 P00 0CB8      781              ldi         cntrlb,25
 782 P00 0CBB 0DAE37 P00 0CBB      782              ldi         cltb,55
 783 P00 0CBE 0DAF1D P00 0CBE      783              ldi         cltab,29
;changed
```

```
 784 P00 0CC1 0DB00A P00 0CC1        784             ldi      tolb,10
;changed
 785 P00 0CC4 0DD430 P00 0CC4        785             ldi      tscr,48
 786 P00 0CC7 CD     P00 0CC7        786             ret
 787 P00 0CC8 0DA802 P00 0CC8        787 linet       ldi      secb,2  ;same
 788 P00 0CCB 0D9C02 P00 0CCB        788             ldi      sec,2
 789 P00 0CCE 0DA90C P00 0CCE        789             ldi      tcntrb,12
 790 P00 0CD1 0DAA5A P00 0CD1        790             ldi      cltmerb,90
 791 P00 0CD4 0DB178 P00 0CD4        791             ldi      cltmerc,120
 792 P00 0CD7 0DAB18 P00 0CD7        792             ldi      toggleb,24
 793 P00 0CDA 0DAC3C P00 0CDA        793             ldi      bcntrlb,60
 794 P00 0CDD 0DAD1E P00 0CDD        794             ldi      cntrlb,30
 795 P00 0CE0 0DAE42 P00 0CE0        795             ldi      cltb,66
 796 P00 0CE3 0DAF23 P00 0CE3        796             ldi      cltab,35
;changed
 797 P00 0CE6 0DB00D P00 0CE6        797             ldi      tolb,13
;changed
 798 P00 0CE9 0DD430 P00 0CE9        798             ldi      tscr,48
 799 P00 0CEC CD     P00 0CEC        799             ret
 800                                 800
 801                                 801
 802                                 802
 803                                 803
 804                                 804
 805                                 805
 806                                 806
 807                                 807
 808                                 808
 809                                 809
 810                                 810
 811                                 811
 812                                 812
 813                                 813
 814                                 814             .org     0ffeh
 815 P00 0FFE 0988   P00 0FFE        815             jp       start
 816                                 816
 817                                 817
 818                                 818
 819                                 819
 820                                 820
 821                                 821
 822                                 822
 823                                 823
 824                                 824
No error detected
No warning
```

What is claimed is:

1. An acoustic switch comprising:

a microphone for producing electrical signals corresponding to a series of received acoustic signals;

a filter coupled to an output of said microphone for producing a filtered acoustic signal from said electrical signals, said filtered acoustic signal comprising only components within a predetermined frequency range;

a first power switch having its operation responsive to an assertion of a first switch signal;

a second power switch having its operation responsive to an assertion of a second switch signal;

a master control device with an input to receive said filtered acoustic signal, a first output for carrying said first switch signal coupled to said first power switch, a second output for carrying said second switch signal coupled to said second power switch, said master control device recognizing a first series of acoustic signals and a second series of acoustic signals different from said first series of acoustic signals and asserting said first switch signal upon recognition of said first series of acoustic signals and asserting said second switch signal upon recognition of said second series of acoustic signals; and a mode selector, coupled to said master control device, for selecting one of two operating modes of the acoustic switch, said operating modes including a normal mode and an away mode.

2. An acoustic switch comprising:

a microphone for receiving a series of acoustic signals;

a bandpass filter coupled to an output of said microphone for passing only acoustic signals received by said microphone that are within a predetermined frequency range;

a first peak detector having an input coupled to said microphone output for producing an unfiltered peak sound signal;

a second peak detector having an input coupled to an output of said bandpass filter for producing a filtered peak sound signal;

a mode selector for selecting one of two operating modes of the acoustic switch, said operating modes including a normal mode and an away mode;

a power switch having its operation responsive to an assertion of a switch signal;

an indicator responsive to said switch signal for indicating when said power switch is operating from said switch signal; and a master control device with a first input to receive said unfiltered peak sound signal, and a second input to receive said filtered peak sound signal, a third input to determine which of said modes said mode selector is set to, and an output coupled to said power switch to control assertions of said switch signal, said master control device for recognizing a particular series of acoustic signals from said signals input at said second input and asserting said switch signal upon recognition of said particular series of acoustic signals during said normal mode and for asserting said switch signal upon detection of a series of acoustic signals from said signals input at said first input during said away mode.

3. The acoustic switch of claim 2 wherein said filter is a bandpass filter that allows a band of frequencies in the range of 2200 HZ to 2800 HZ to pass.

4. The acoustic switch of claim 3 wherein said bandpass filter comprises three stages, each stage having a gain of about 14 at 2500 HZ and a sharp roll-off.

5. The acoustic switch of claim 2 wherein said first and second power switches are bilateral triode switches (triacs).

6. The acoustic switch of claim 2 wherein said mode selector selects one of three operating modes of the acoustic switch, said operating modes including a normal mode, an away mode, and a learn mode.

7. The acoustic switch of claim 6 further comprising a beeper coupled to a second output of said master control device for alerting a user that the acoustic switch, while operating in learn mode, successfully learned a user-specified series of acoustic signals and for giving an audible indication that the acoustic switch, while operating in away mode, is about to dessert said switch signal.

8. The acoustic switch of claim 2 further comprising:

a housing member with at least two plug receptacles for electrical appliances that are operated by the acoustic switch to plug into, said housing member having a plurality of metal prongs adapted to being plugged into an electrical outlet.

9. An acoustic switch comprising:

a sound detector for receiving a series of acoustic signals;

a bandpass filter coupled to an output of said sound detector for passing only acoustic signals received by said sound detector that are within a predetermined frequency range;

a mode selector for selecting one of two operating modes of the acoustic switch, said operating modes including a normal mode and an away mode;

a power switch having its operation responsive to an assertion of a switch signal; and a master control device having a first input coupled to an output of said sound detector, a second input coupled to said output of said bandpass filter, a third input, coupled to said mode selector, to determine which of said modes said mode selector is set to, and an output coupled to said power switch to control assertions of said switch signal, said master control device for recognizing a particular series of acoustic signals from said signals input at said second input and asserting said switch signal upon recognition of said particular series of acoustic signals during said normal mode and for asserting said switch signal upon detection of a series of acoustic signals from said signals input at said first input during said away mode.

* * * * *